Feb. 21, 1950          J. E. THOLL          2,498,314
CONTROLLING MECHANISM FOR CENTRIFUGAL SEPARATORS
Filed April 3, 1946          4 Sheets-Sheet 1
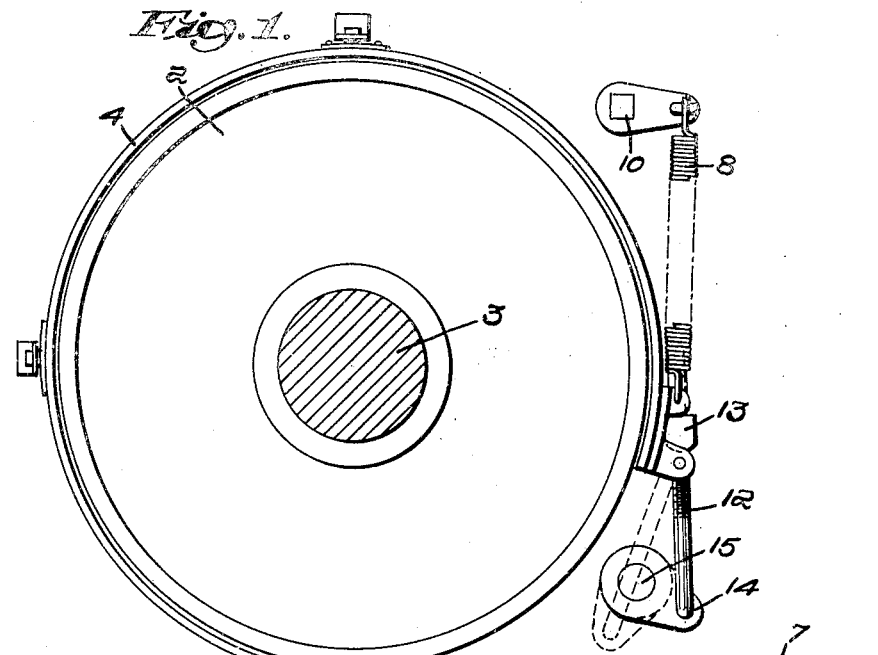
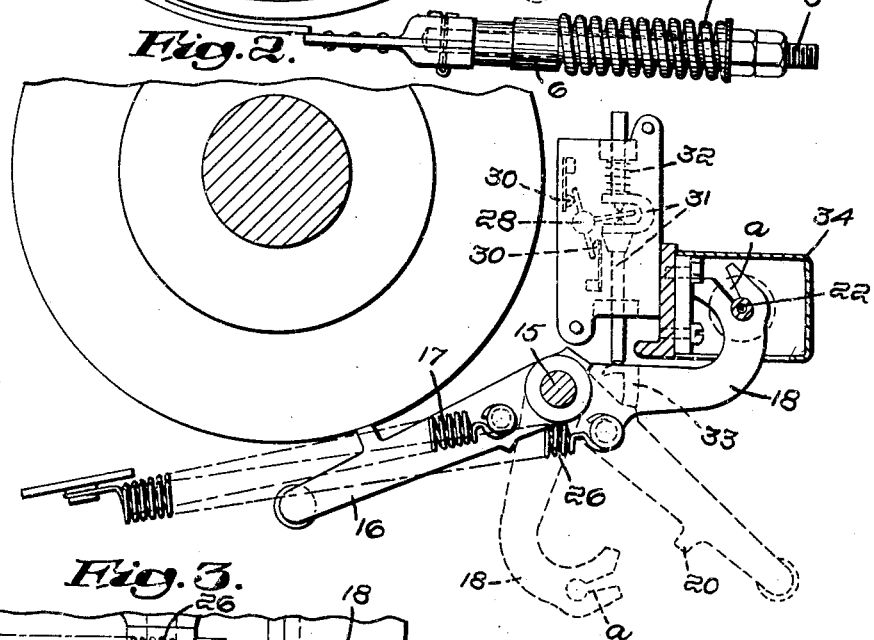
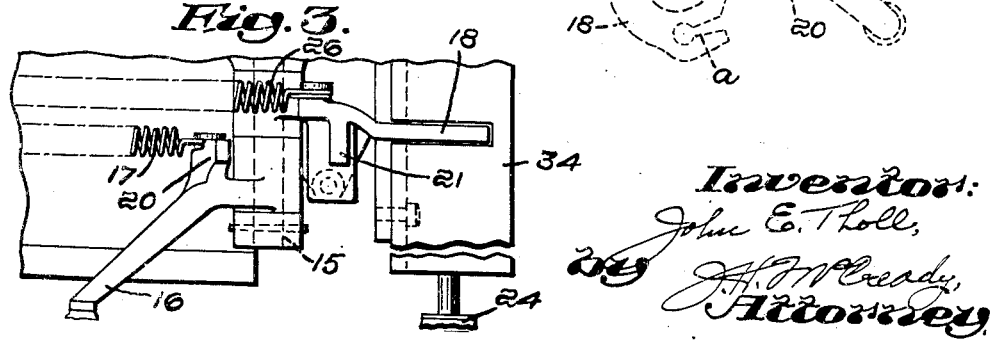
Inventor:
John E. Tholl,
by J. H. McCready,
Attorney

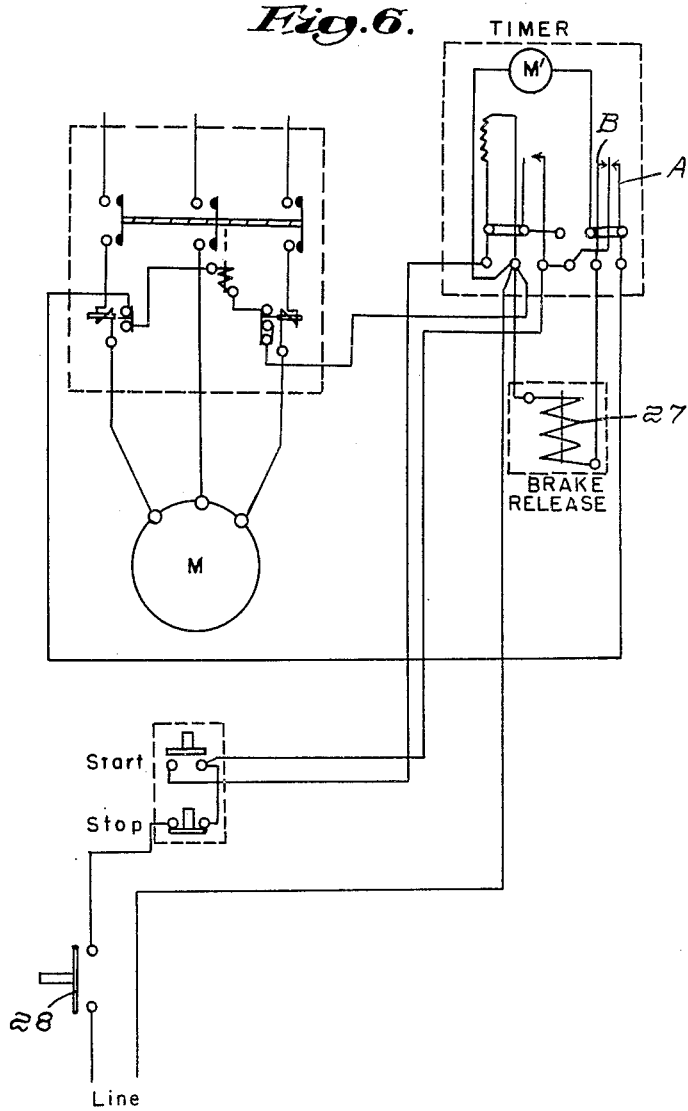

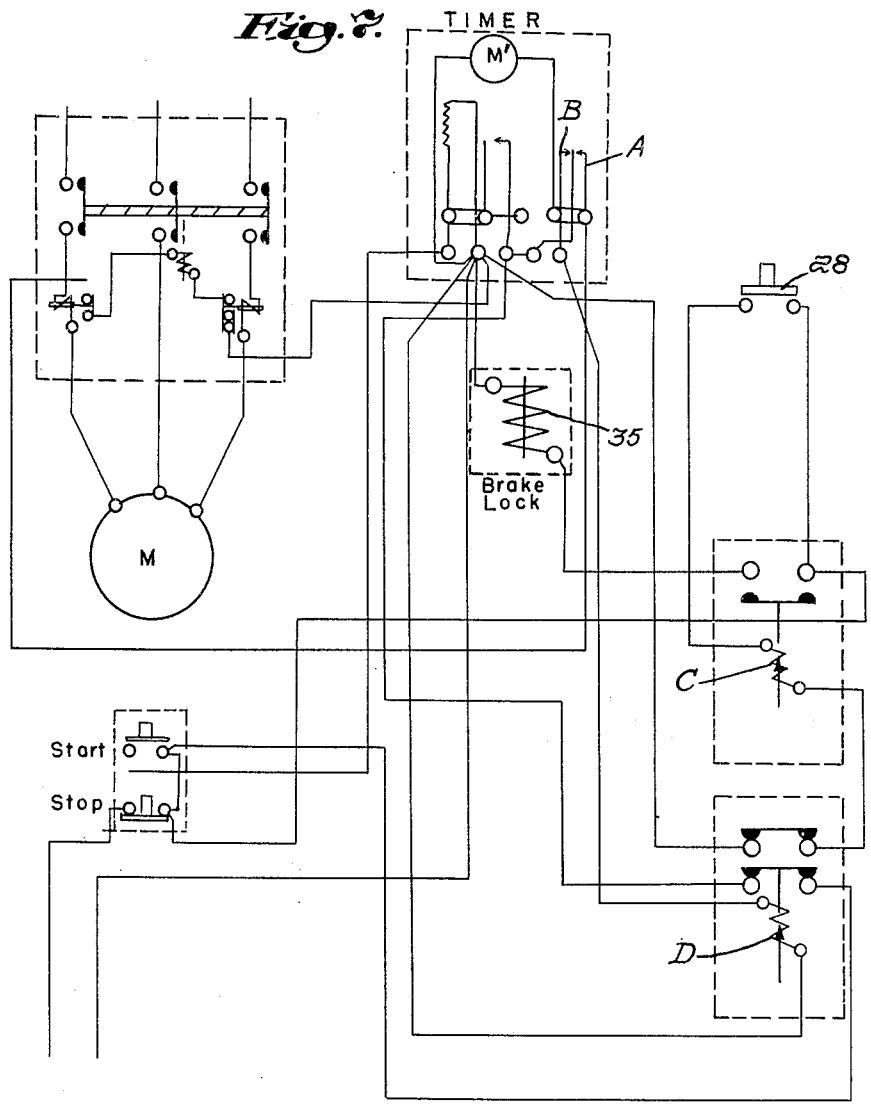

Patented Feb. 21, 1950

2,498,314

UNITED STATES PATENT OFFICE 2,498,314

CONTROLLING MECHANISM FOR CENTRIFUGAL SEPARATORS

John E. Tholl, Needham, Mass., assignor to American Tool & Machine Co., Hyde Park, Mass., a corporation of Massachusetts Application April 3, 1946, Serial No. 659,239

7 Claims. (Cl. 192—2)

This invention relates to automatically operated brake mechanisms for controlling the operation of centrifugal separators, and it will be herein disclosed as embodied in a mechanism designed more especially to meet the requirements of the operation of centrifugal separators in sugar refiners and plants in which similar conditions exist. The invention aims to devise a mechanism of this character which not only will be exceptionally convenient for the workmen to operate but which, also, will contribute very substantially to the safety of both the machine and the operator.

The nature of the invention will be readily understood from the following description when read in connection with the accompanying drawings, and the novel features will be particularly pointed out in the appended claims.

In the drawings,

Fig. 1 is a plan view of a typical brake mechanism to which this invention is applicable;

Fig. 2 is a plan view of parts of a brake operating mechanism constructed in accordance with this invention;

Fig. 3 is a side view of some parts of the mechanism shown in Fig. 2;

Figs. 6 and 7 are wiring diagrams showing typical arrangements in which these brake controlling systems may be employed.

The invention will be herein disclosed in connection with a brake mechanism of the character shown and described in my earlier Patent No. 2,112,430, granted March 29, 1938, and reference may be made to that patent for a more detailed illustration of the brake mechanism.

Figure 4:
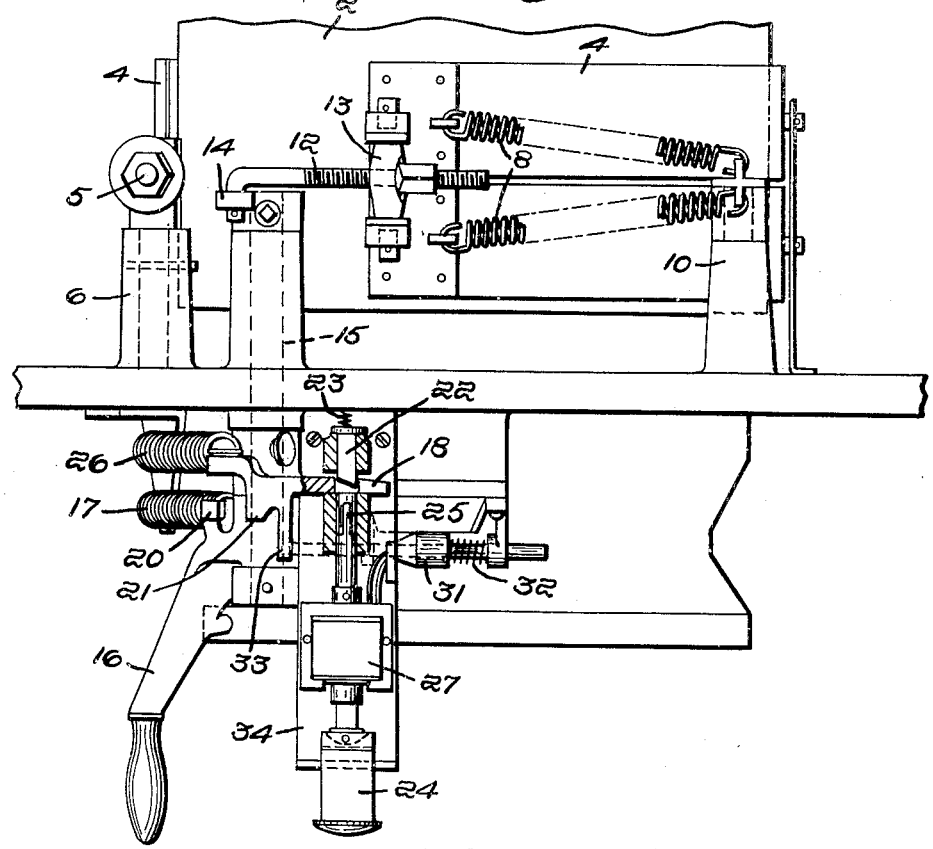
Fig. 4 is a side elevation of the brake mechanism shown in Fig. 1 and much of the controlling mechanism illustrated in Fig. 2.

As shown more particularly in Figs. 1 and 4, it comprises a brake drum 2 fast on the basket shaft 3 of a centrifugal separator. Substantially encircling this drum is a brake band 4 anchored at one end on a draw bar 5 which is slidable through the post 6 and is encircled by a spring 7 which constantly exerts a strong pull on said bar in a direction to tighten the band 4 around the brake drum. The opposite end of the brake band has two springs 8 connected to it and anchored to the post 10 so that they tend to release the brake. In order to tighten it against the action of these springs a rod 12 is secured at one end to the end of the band 4 by means of a pivoted yoke 13, and it is pivoted at its opposite end to a lever arm 14 secured fast on the upper end of a shaft 15 which rocks about a vertical axis in a bearing post mounted fast on the machine frame. A hand lever 16, Figs. 2 and 4, is mounted loosely on the lower end portion of the shaft 15 and a spring 17, connected with this lever, is strong enough to keep said lever in the position shown in Fig. 2 when it is allowed to do so.

Mounted fast on the shaft 15 is a latch lever 18. When the lever 16 is swung in a counter-clockwise direction to release the brake, a dog 20, Fig. 3, on said lever engages another dog 21 on the latch lever 18 and swings this latch from its dotted line position, Fig. 2, to the full line position in which it is shown in said figure. At this time the end of the latch lever slides under a plunger 22, pressed downwardly by the spring 23, Fig. 4, and snaps into a hole in the latch lever 18 and locks it, thus holding the brake in its inoperative condition where the brake drum and its shaft 3 are free to revolve.

When it is desired to stop the centrifugal the latch 18 may be released manually by pushing upward on the bottom of the plunger 24, this plunger having an extension projecting upwardly from it and terminating in a pin 25, Fig. 4, which lies directly under, and in alignment with, the plunger 22. Consequently, when this plunger is lifted the end of the pin 25 enters a hole in the bottom of the plunger 22, raises the latter, and thereby releases the latch 18. A strong spring 26, Fig. 2, immediately acts on the latch 18 to swing it, and the shaft 15 to which it is secured, in a clockwise direction, Fig. 2, and thereby contracts the brake band 4 on the drum 2 and stops the machine. The swinging movement of the latch 18 just described is permitted, notwithstanding the fact that the pin 25 has been pushed up through it, by the slot $a$, Fig. 2, in the end of the latch lever.

Provision also is made for releasing the latch 18 and stopping the machine by remote control. For this purpose a solenoid 27, Fig. 4, is arranged to encircle the shaft of the plunger 24, and it includes a section of magnetic metal so positioned with reference to the solenoid that when the latter is energized it lifts the plunger pin 25 and trips the latch releasing plunger 22, in the manner above described, and stopping the machine.

In this connection it may be pointed out that as soon as the latch lever 18 is locked in its "power-on" and "brake-off" position, and the hand lever 16 is released, its spring 17 immediately returns it to its idle position, and this movement does not affect the position of the latch because of the lost motion relationship between the two parts 16 and 18; or, in other words, the fact that the lever 16 is free to rotate around the shaft 15. Consequently, when the latch 18 is released no movement of the lever 16 occurs, as would be the case if it were left in its dotted line position, Fig. 2, where a quick backward swing might strike and injure a workman.

Also included in the electrical connections is a safety switch 28, Fig. 2, which, in the position there shown, closes a circuit through contacts 30—30. This switch is operated by a horizontally slidable plunger, including a U-shaped section 31, Fig. 2, the plunger normally being held by a spring 32 in position to maintain the switch open. However, when the operating lever 16 is swung to the "brake-off" position, which occurs only after the main switch for the motor has been closed, a lug 33 extending from the latch lever 18 engages one end of the plunger 31 and forces it backwardly far enough to tip the switch into the position shown in Fig. 2, where it closes the switch. It remains in its closed position so long as the handle is in its "brake-off" positions, but it is opened automatically by the spring 32 whenever the brake latch is released and the brake is applied. This switch is connected in series with the main switch controlling the driving motor. Consequently, the machine cannot be started up until both the main switch and the safety switch 28 have been closed. Thus, the brake control mechanism and the switch 28 are so interlocked that if the operator should leave the machine with the brake on, he could not start it up without first releasing the brake.

Preferably the latch, switch mechanism, and adjacent parts, are enclosed in a suitable casing, such as that shown at 34.

Figure 5:
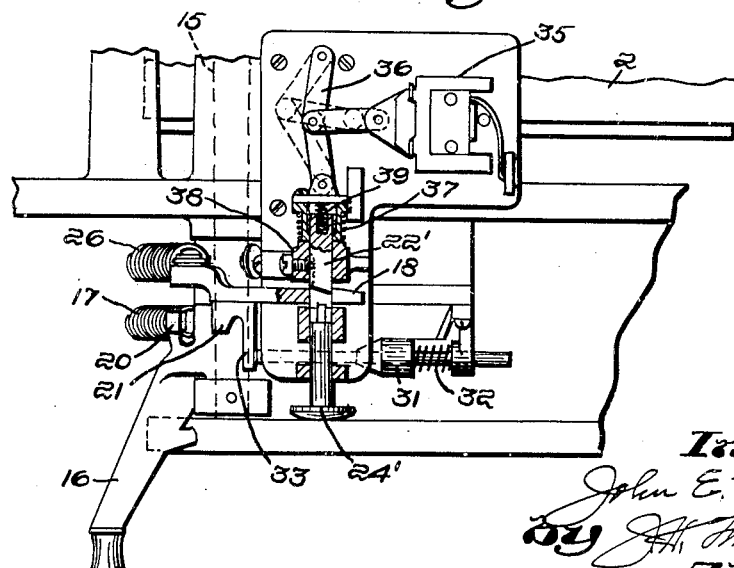
Fig. 5 is a view similar to Fig. 4 showing a modification.

In many cases it is desirable to provide for the automatic setting of the brake in the event of a power failure. An arrangement devised for this purpose is illustrated in Fig. 5 where the switch 28 is included, as shown in Fig. 2, and is operated in the same manner but is connected in a circuit to control the application of power to a solenoid 35 so that when the switch is closed it energizes this solenoid and causes it to strengthen the toggle 36. This forces down the assembly, including the locking plunger 22', and holds this lock in its operative position. This movement is transmitted through an outer coiled spring 37, which is held compressed so long as the solenoid is energized, and the toggle, therefore, remains straightened. If power should fail, thus de-energizing the solenoid 35, its plunger would be forced toward the left, Fig. 5, by an internal spring (not shown) thus breaking the toggle and at the same time releasing the energy of the spring 37 which lifts the sleeve 38 in which the latch locking plunger 22' is enclosed. There is a short lost-motion connection between this sleeve and the head of the plunger so that when this lost motion has been taken up by the upward movement of the plunger it will strike the head of the plunger 22' with a hammer blow of sufficient intensity to lift it out of the hole in the latch 18 and release the latter. This mechanism also includes a manually operated plunger 24' by means of which the latch 18 can be released at any time, as in the arrangement shown in Fig. 4.

While this mechanism may be used in a considerable variety of control circuits, a typical circuit is illustrated in Fig. 6, designed more especially for use with the embodiment of the invention illustrated in Figs. 1 to 4, inclusive. A detailed description of the circuit is not deemed necessary, but it may be pointed out that in starting the machine from rest, the operator first swings the lever 16 in a counter-clockwise direction, as above described, to latch the brake in its "off" position. At the same time this closes the brake interlock switch or safety switch 28. This switch must be closed before any circuit in the control system will work.

The operator then presses the "start" button which brings the timer into action. As it is started the contact A is closed and remains closed for the duration of the time period. The circuit which this contact A controls energizes the holding coil of the main motor M and thus starts up this motor and the basket shaft of the centrifugal separator driven by it. At the end of the period for which the timer dial is set, the contact A is opened and contact B is closed, thus cutting off power from the main motor M while simultaneously energizing the brake release solenoid 27. This permits the brake springs to apply the brake, stop the centrifugal, and also results in opening the safety switch 28.

Time controlling mechanisms of this character are manufactured by the Automatic Temperature Control Company, and several other concerns, and they are used to some extent in connection with the operation of centrifugal separators.

Fig. 7 illustrates diagrammatically an arrangement with which the construction shown in Fig. 5 can be used. Here again, in starting up from a condition of rest, the operator must latch the brake in its "off" position, which closes the switch 28 and results in closing the relay control switch C and energizes the brake lock solenoid 35. This operates the plunger 22' to lock the brake in its "off" position, as above described. The operator then presses the "start" button which brings the timer control into action with the same results above described.

In this circuit a second relay D is employed for two purposes—first, to de-energize the coil 35 at the end of the cycle, and, second, to cut off the timer in readiness for re-cycling. Consequently, at the end of the time period for which the timer dial is set, the contact A is opened, B is closed, thus cutting power off the main motor M; and the closing of contact B energizes relay D, which then operates to de-energize the brake coil 35. This, as above explained, results in setting the brake and stopping the centrifugal. This ends the cycle.

With the first of these control systems, therefore, the centrifugal is started into operation by the manual actuation of the lever 16, and such operation may be interrupted and the brake set either by manually actuating the plunger 24, or by remote control through the solenoid 27.

With the second mechanism the same starting operation may be performed and the machine may be stopped and the brake set either manually or automatically by a failure of power. In both cases the safety switch 28 prevents starting up the centrifugal with the brake on.

Also, in both cases the danger of accident to a workman in the vicinity of the control system, due to the release of the hand lever either manually or automatically, is avoided by the lost-motion connection above described and the fact that the hand lever is returned to its inoperative condition automatically immediately after it has been used to latch the brake in its "off" position.

While I have herein shown and described preferred embodiments of my invention, it will be evident that the invention is susceptible of embodiment in other forms within the spirit and scope thereof.

Having thus described my invention, what I desire to claim as new is:

1. In a control mechanism for centrifugal separators, the combination with an electric motor for driving the basket shaft of the centrifugal and a brake for stopping the rotation of said shaft, of mechanism for locking said brake in its "off" position, means for applying said brake automatically upon the release of said locking mechanism, and apparatus operable to release said locking mechanism selectively by electrical control or manually, as desired.

2. In a control mechanism for centrifugal separators, the combination with an electric motor for driving the basket shaft of the centrifugal and a brake for stopping the rotation of said shaft, of mechanism for locking said brake in its "off" position, means for applying said brake automatically upon the release of said locking mechanism, and apparatus operable to release said locking mechanism selectively by remote control or manually, as desired.

3. A control mechanism according to preceding claim 1, in combination with means for preventing the starting up of said centrifugal separator while the brake is in its "on" position.

4. A control mechanism according to preceding claim 1, in combination with means under the control of said brake controlling mechanism for preventing said centrifugal separator from being started up without first releasing said brake.

5. In a control mechanism for centrifugal separators, the combination with an electric motor for driving the basket shaft of the centrifugal and a brake for stopping the rotation of said shaft, of operating mechanism for said brake comprising an operating lever and a latch lever both mounted to swing about a common axis, a lock operable to hold said latch lever in position to lock said brake in its "off" position, springs connected with both said levers to hold them normally in their inactive positions, a lost-motion connection through which said operating lever is operable to move the latch lever into its brake-releasing position where it will be held by said lock while the operating lever is returned by its spring to its inactive position, and means for applying said brake automatically to stop said shaft when said lock releases said latch lever.

6. A control mechanism according to preceding claim 5, in combination with a control circuit for said motor, a solenoid in said circuit controlling the operation of said lock, and a switch controlling said motor and itself controlled by the position of said latch lever.

7. In a control mechanism for centrifugal separators, the combination with an electric motor for driving the basket shaft of the centrifugal and a brake for stopping the rotation of said shaft, of operating mechanism for said brake comprising an operating lever and a latch lever both mounted to swing about a common axis, a spring-pressed plunger operable to lock said latch lever in position to hold said brake in its off position, springs connected with both said levers to hold them normally in their inactive positions, a lost motion connection through which said operating lever is operable to move the latch lever into its brake-releasing position where it will be held by said plunger while the operating lever is returned by its spring to its inactive position, means for applying said brake automatically to stop said shaft when said plunger is moved to release said latch lever, a brake interlocking switch under the control of said latch lever, a control circuit for said motor in which said switch is so connected as to prevent the motor from being started up while the brake is on, a solenoid associated with said plunger to operate it to release said latch lever, and a relay-controlled switch for energizing said solenoid, the last mentioned switch being under the control of said brake interlocking switch.

JOHN E. THOLL.

REFERENCES CITED

The following references are of record in the file of this patent:

UNITED STATES PATENTS

| Number | Name | Date |
|---|---|---|
| 676,263 | Kitsee | June 11, 1901 |
| 1,865,584 | Perry | July 5, 1932 |